United States Patent
Kippley

(10) Patent No.: US 6,833,635 B2
(45) Date of Patent: Dec. 21, 2004

(54) DUAL INPUT DC-TO-DC POWER CONVERTER

(75) Inventor: Robert H. Kippley, Eagan, MN (US)

(73) Assignee: Artesyn Technologies, Inc., Boca Raton, FL (US)

( * ) Notice: Subject to any disclaimer, the term of this patent is extended or adjusted under 35 U.S.C. 154(b) by 152 days.

(21) Appl. No.: 10/191,353

(22) Filed: Jul. 8, 2002

(65) Prior Publication Data

US 2004/0004402 A1 Jan. 8, 2004

(51) Int. Cl.[7] .................................................. H02J 1/00
(52) U.S. Cl. ......................................... 307/83; 307/84
(58) Field of Search .................................... 307/82, 83

(56) References Cited

U.S. PATENT DOCUMENTS

| | | | |
|---|---|---|---|
| 3,398,292 A | 8/1968 | Kuba | |
| 3,769,571 A | * 10/1973 | Wilkinson | 363/134 |
| 4,010,381 A | 3/1977 | Fickenscher et al. | |
| 4,038,559 A | 7/1977 | Chun et al. | |
| 4,805,081 A | 2/1989 | Chambers et al. | 363/96 |
| 5,138,547 A | 8/1992 | Swoboda | 363/143 |
| 5,338,994 A | 8/1994 | Lezan et al. | 307/86 |
| 5,959,858 A | 9/1999 | Kanouda et al. | 363/149 |
| 6,198,178 B1 | * 3/2001 | Schienbein et al. | 307/82 |
| 6,297,972 B1 | 10/2001 | Chen | 363/37 |
| 6,317,346 B1 | 11/2001 | Early | 363/65 |
| 6,370,047 B1 | 4/2002 | Mallory | 363/65 |

* cited by examiner

Primary Examiner—Bao Q. Vu
(74) Attorney, Agent, or Firm—Kirkpatrick & Lockhart LLP

(57) ABSTRACT

A dual input power converter. The dual input power converter includes a transformer, a first primary circuit, and a second primary circuit. The transformer includes a first primary winding and a second primary winding. The first primary circuit is for coupling a first power source to the first primary winding. The second primary circuit is for coupling a second power source to the second primary winding.

26 Claims, 3 Drawing Sheets

DUAL INPUT DC-TO-DC POWER CONVERTER

BACKGROUND OF INVENTION

For many businesses, the need to keep certain equipment operating is critical to the success of the business, and the loss of electrical power can be devastating. Accordingly, many such businesses plan for ensuring a continuous supply of electrical power. However, known methods commonly used for ensuring a continuous supply of electrical power can be relatively expensive to employ and maintain.

The power supply system for a particular application may include an Uninterruptible Power Supply (UPS) that utilizes battery back-up and redundancy to supply virtually continuous power to the equipment. However, such a system typically has a relatively high front-end cost and generally requires substantial maintenance.

As an alternative, the power supply system may include two separate utility feeds from different distribution points. The power supply system may also include two separate AC to DC power converters. One AC to DC power converter may be connected to one utility feed, and the other AC to DC power converter may be connected to the other utility feed. For many applications, the performance of such a system is generally acceptable because the risk of the simultaneous loss of the two separate utility feeds is relatively low. Although this approach is more economical than utilizing an Uninterruptible Power Supply, the overall cost associated with such a system is still relatively high because of the need for the two separate AC to DC power converters.

SUMMARY

In one general respect, the present invention is directed to a dual input power converter. According to one embodiment, the dual input power converter includes a transformer having a first and second primary windings and a secondary winding. The converter further includes a first primary circuit for coupling a first power source to the first primary winding, and a second primary circuit for coupling a second power source to the second primary winding. In addition, the converter may include a secondary circuit connected to the secondary winding for rectifying a voltage across the secondary winding. Further, the converter may include a control circuit coupled to the first and second primary circuits for controlling the first and second primary circuits. The control circuit may control the first and second primary circuits such that the first and second primary circuits cyclically couple the first and second power sources, respectively, to the transformer at a common frequency in an interleaved mode such that, during a switching cycle, the first primary circuit couples the first power source to the transformer during a first interval of the switching cycle and the second primary circuit couples the second power source to the transformer during a second, subsequent interval of the switching cycle. Additionally, according to another embodiment, the control circuit may control the first primary circuit to couple the first power source to the transformer at twice the common frequency when the second power source fails. According to other embodiments, the power converter may further include current sense transformers in series with the first and second primary windings. In addition, according to other embodiments, the primary circuits may include one or two switching devices for coupling the input power sources to the primary windings.

DETAILED DESCRIPTION OF THE INVENTION

Figure 1:
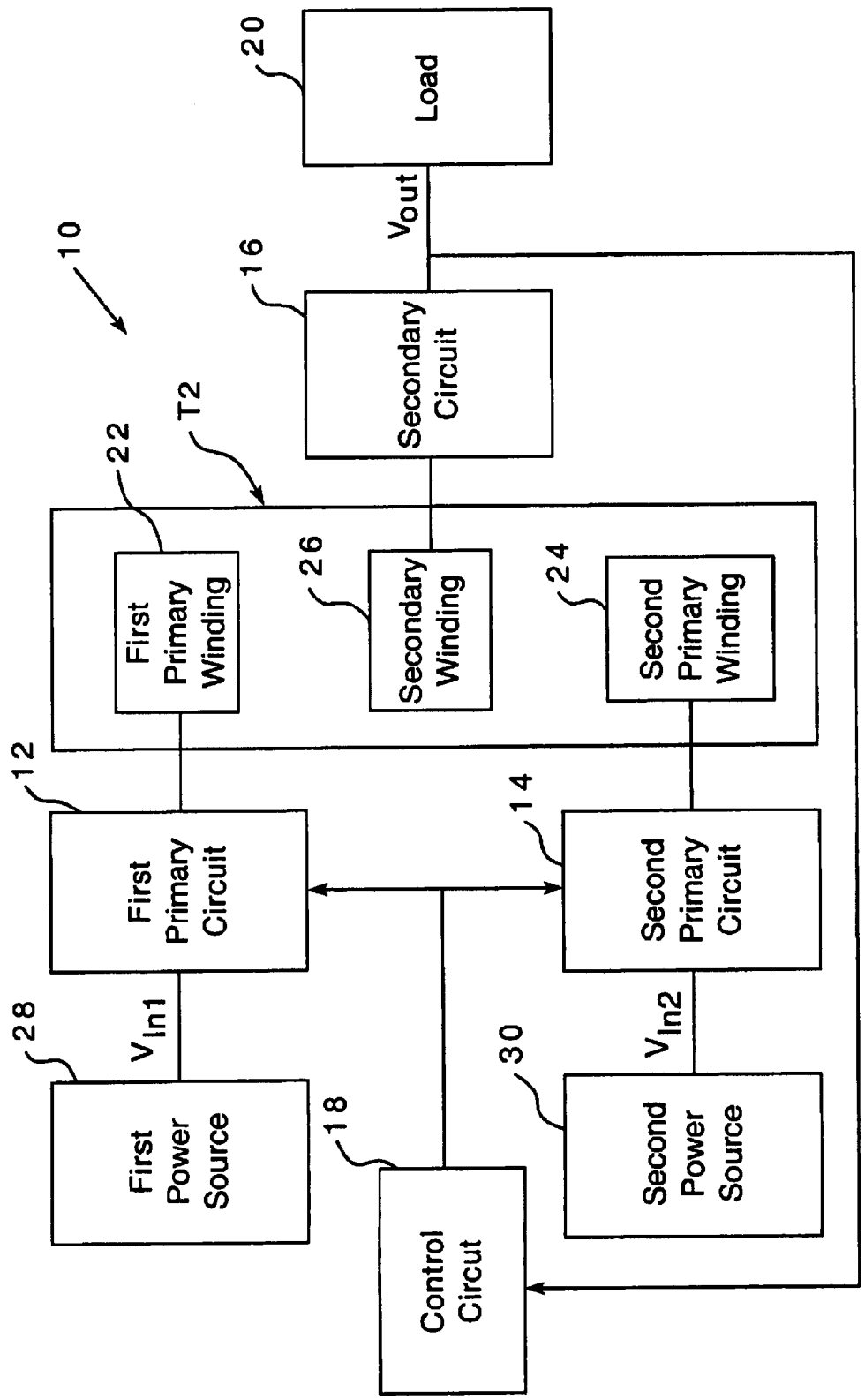
FIG. 1 is a simplified block diagram of a dual input power converter according to one embodiment of the present invention.

FIG. 1 is a simplified block diagram of a dual input power converter 10 according to one embodiment of the present invention. The power converter 10 may include a transformer T2, first primary circuit 12, a second primary circuit 14, a secondary circuit 16, and a control circuit 18. The power converter 10 may be used to power a load 20.

The transformer T2 may include a first primary winding 22, a second primary winding 24, and a secondary winding 26. The first primary circuit 12 may be coupled to the first primary winding 22, and the second primary circuit 14 may be coupled to the second primary winding 24. The first primary circuit 12 may also be coupled to a first power source 28, and the second primary circuit 14 may be coupled to a second power source 30. Thus, the first primary circuit 12 may be for coupling the first power source 28 to the first primary winding 22, and the second primary circuit 14 may be for coupling the second power source 30 to the second primary winding 24. According to one embodiment, the first and secondary primary circuits 12, 14 may be implemented, for example, as primary circuits of a single-transistor forward converter or as the primary circuits of a two-transistor forward converter. The first primary circuit 12 may be independent of and electrically isolated from the second primary circuit 14, and the first power source 28 may be independent of and electrically isolated from the second power source 30. The first and second power sources 28, 30 may be, for example, the output of an AC-DC converter, the output of another DC-DC converter, the output of an uninterruptible power supply, the output of a battery, or any combination thereof. According to one embodiment, the input voltage of the first primary circuit 12 ($V_{IN1}$) may have the same value as the input voltage of the second primary circuit 14 ($V_{IN2}$).

The secondary circuit 16 may be coupled to the secondary winding 26 of the transformer T2. According to one embodiment, the secondary circuit 16 may be for generating a DC output voltage by rectifying and filtering the secondary winding voltage. The control circuit 18 may regulate the switching devices of the first and second primary circuits 12, 14 based on the output voltage $V_{out}$ to maintain, for example, a desired DC output voltage.

Figure 2:
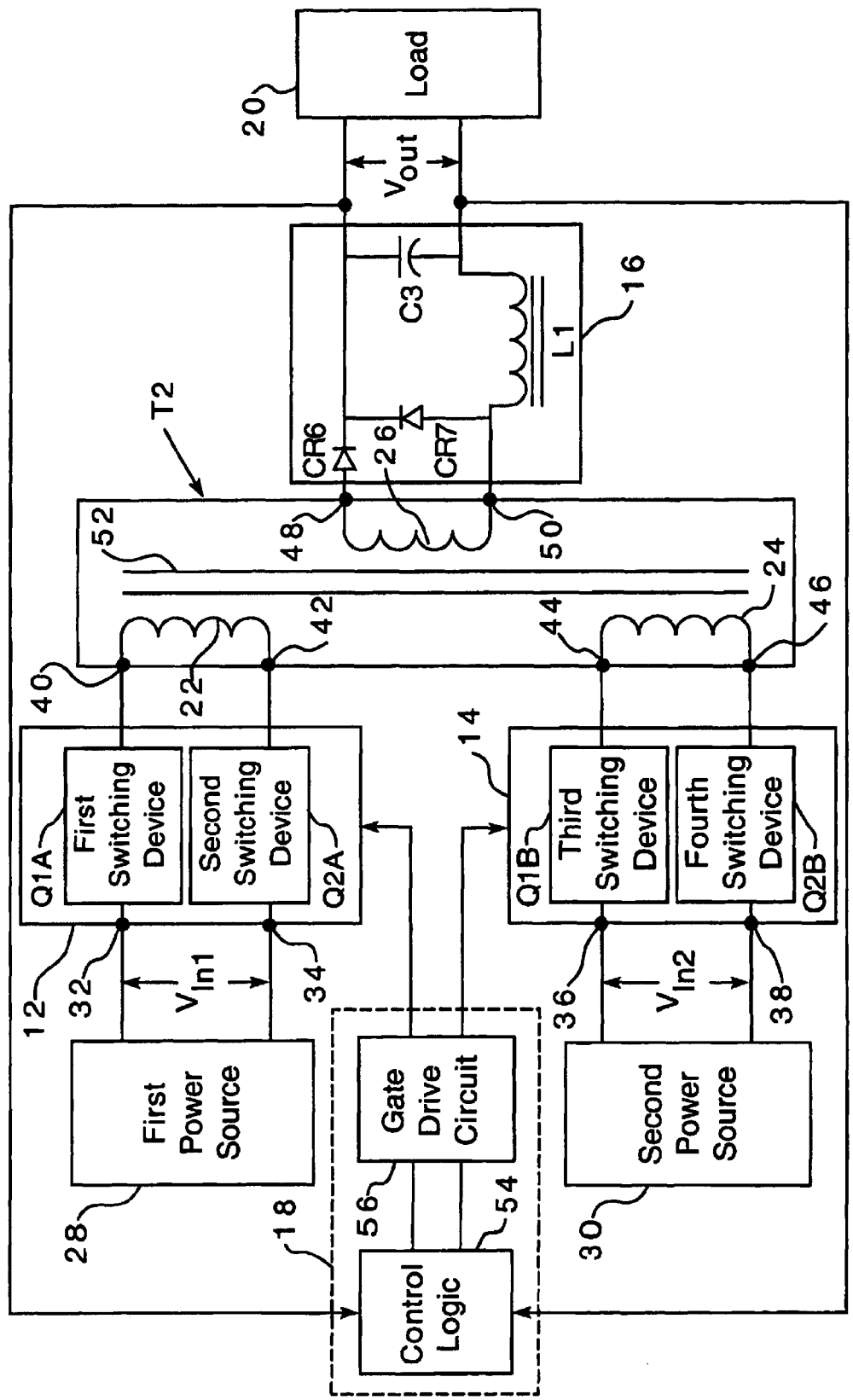
FIG. 2 is a simplified circuit diagram of the power converter of FIG. 1 according to one embodiment of the present invention.

FIG. 2 is a simplified circuit diagram of the power converter 10 of FIG. 1 according to one embodiment of the present invention. As illustrated in FIG. 2, the first primary circuit 12 may include input terminals 32, 34, and switching devices Q1A, Q2A. The switching device Q1A may be coupled to a high side of the first power source 28, and the switching device Q2A may be coupled to a low side of the first power source 28. The second primary circuit 14 may include input terminals 36, 38, and switching devices Q1B, Q2B. The switching device Q1B may be coupled to a high side of the second power source 30, and the switching device Q2B may be coupled to a low side of the second power source 30. The switching devices Q1A, Q2A, Q1B, Q2B may be implemented as, for example, MOSFETs, bipolar switching devices such as, for example, BJT's or IGBT's, or any combination thereof. According to one embodiment, each of the switching devices Q1A, Q2A, Q1B, Q2B is an N-channel MOSFET.

As described hereinabove, the transformer T2 may include a first primary winding 22, a second primary winding 24, and a secondary winding 26. The first primary winding 22 may include transformer terminals 40, 42. The second primary winding 24 may include transformer terminals 44, 46. The secondary winding 26 may include transformer terminals 48, 50. The first primary winding 22 may be coupled to the switching device Q1A via the transformer terminal 40, and may be coupled to the switching device Q2A via the transformer terminal 42. The second primary winding 24 may be coupled to the switching device Q1B via the transformer terminal 44, and may be coupled to the switching device Q2B via the transformer terminal 46. As illustrated in FIG. 2, the first primary winding 22, according to one embodiment, is not connected in series with the second primary winding 24. The transformer T2 may also include a core 52. The core 52 may be comprised of a ferromagnetic material that may serve as a path for magnetic flux. The secondary winding 26 of the transformer T2 may be magnetically coupled to the first and second primary windings 22, 24 of the transformer T2, and may be electrically isolated from the first and second primary windings 22, 24 of the transformer T2.

The secondary circuit 16 may be coupled to the transformer terminals 48, 50, and may include current rectifiers CR6, CR7. According to one embodiment, current rectifiers CR6, CR7 may be implemented as diodes, as illustrated in FIG. 2. The anode of diode CR6 may be coupled to the transformer terminal 48, and the anode of diode CR7 may be coupled to the transformer terminal 50. According to other embodiments, the current rectifiers CR6, CR7 may be alternatively configured to achieve rectification of the secondary winding voltage. In addition, according to another embodiment, one or both of the current rectifiers CR6, CR7 may include a semiconductor switch, such as a MOSFET, configured as a synchronous rectifier. The synchronous rectifier may be control-driven or self-driven. The secondary circuit 16 may also include capacitor C3 and inductor L1 for filtering the rectified voltage supplied to the load 20.

Figure 3:
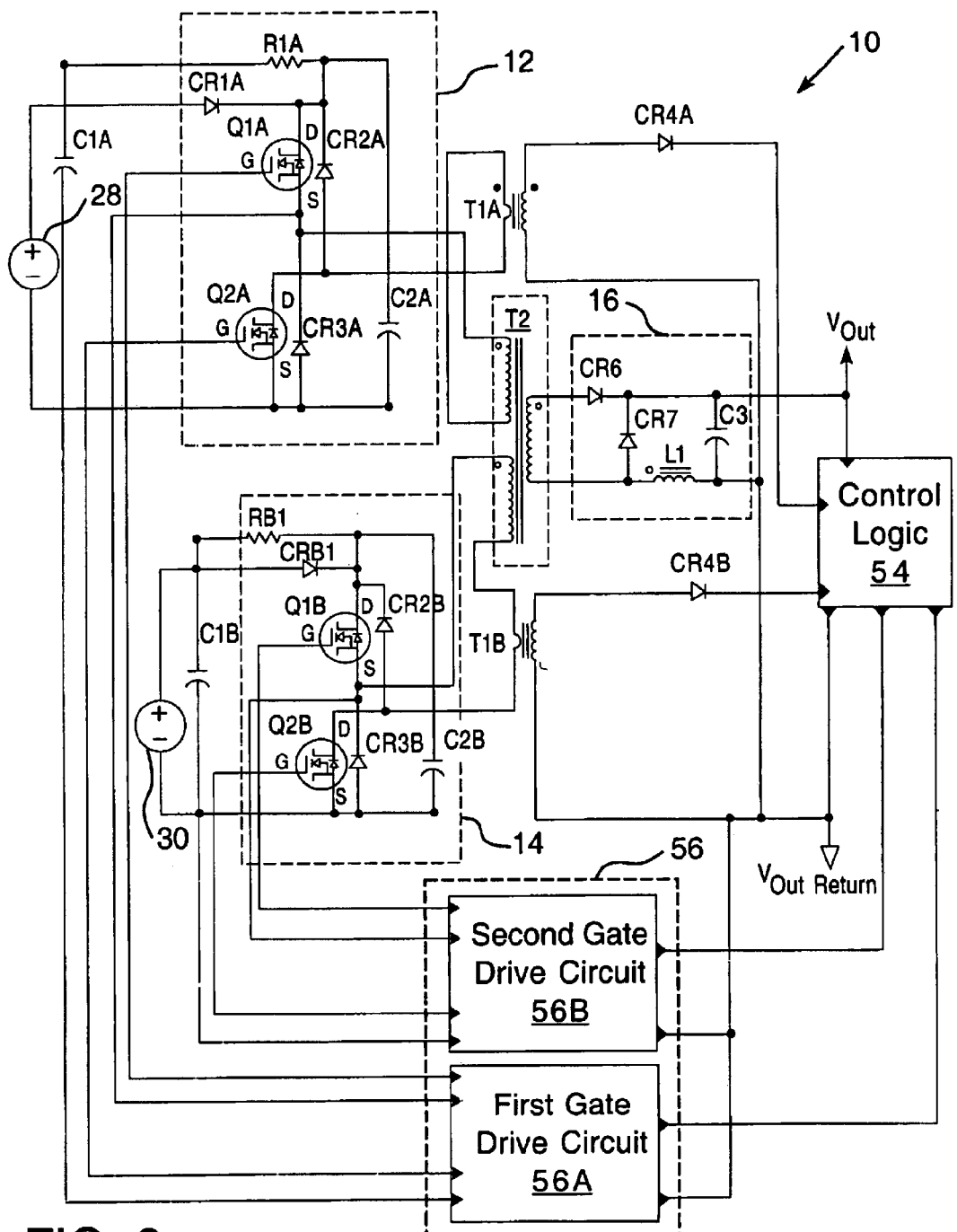
FIG. 3 is a more detailed circuit diagram of the power converter of FIG. 1 according to another embodiment of the present invention.

The control circuit 18 may include a control logic circuit 54 and a gate drive circuit 56. The control logic circuit 54 may receive an input indicative of the output voltage ($V_{OUT}$) of the power converter 10 (i.e., the output voltage of the secondary circuit 16). The gate drive circuit 56 may be coupled to the control logic circuit 54. According to one embodiment, the gate drive circuit 56 may include first and second gate drive circuits 56A, 56B as shown in FIG. 3. The first gate drive circuit 56A may be coupled to the switching devices Q1A, Q2A of the first primary circuit 12, and the second gate drive circuit 56B may be coupled to the switching devices Q1B, Q2B of the second primary circuit 14. According to one embodiment, the first gate drive circuit 56A is for providing an adequate drive voltage to the control terminals of the switching devices Q1A, Q2A of the first primary circuit 12, and the second gate drive circuit 56B is for providing an adequate drive voltage to the control terminals of the switching devices Q1B, Q2B of the second primary circuit 14. According to another embodiment, the control circuit 18 may be electrically isolated from the first and second primary circuits 12, 14.

FIG. 3 is a more detailed circuit diagram of the power converter 10 of FIG. 1 according to another embodiment of the present invention. As shown in FIG. 3, the first and second power sources 28, 30 may be connected across capacitors C1A, C1B, respectively, such that the voltage across the capacitors C1A, C1B correspond to the respective input voltages. Capacitors C1A, C1B may be, for example, bulk capacitors.

According to one embodiment, the first primary circuit 12 may include a resistor R1A, current rectifiers CR1A, CR2A and CR3A, and a capacitor C2A. The current rectifiers CR1A, CR2A and CR3A may be implemented, for example, as diodes. As illustrated in FIG. 3, the resistor R1A may be connected in parallel with current rectifier CR1A, and in series with capacitors C1A and C2A and current rectifier CR2A. As shown in FIG. 3, for an embodiment in which switching devices Q1A, Q2A are MOSFETS, the drain terminal of switching device Q1A may be coupled to the high side of the first power source 28, the source terminal may be coupled to the transformer terminal 40 of the first primary winding 22, and the gate terminal may be coupled to the first gate drive circuit 56A. For switching device Q2A, the drain terminal may be coupled to the transformer terminal 42 of the first primary winding 22, the source terminal may be coupled to the low side of the first power source 28, and the gate terminal may be coupled to the first gate drive circuit 56A. The second primary circuit 14 may be configured similarly to the first primary circuit 12, as illustrated in FIG. 3, and therefore is not further described herein.

The control logic circuit 54 may include a controller (not shown) for controlling the operation of switching devices Q1A, Q2A, Q1B and Q2B via the first and second gate drive circuits 56A, 56B. According to one embodiment, the controller may be, for example, a pulse-width-modulation control IC such as, for example, one of the 3825 family of PWM controllers available from Texas Instruments.

The power converter 10 may also include first and second current sensing transformers T1A, T1B. According to one embodiment, the first and second current sensing transformers T1A, T1B may be, for example, window-type current transformers. As illustrated in FIG. 3, the current sensing transformer T1A may be connected in series with the first primary winding 22 of the transformer T2 such that the current through current sensing transformer T1A is the same as the current through the first primary winding 22. A current rectifier CR4A may couple the current sensing transformer T1A to the control logic circuit 54. Similarly, the current sensing transformer T1B may be connected in series with the second primary winding 24 of the transformer T2, and a current rectifier CR4B may couple the current sensing transformer T1B to the control logic circuit 54. Thus, the control logic circuit 54 may receive signals indicative of the current through the first and secondary primary windings 22, 24 of the transformer T2.

As illustrated in FIG. 3, the transformer T2, the current sensing transformers T1A, T1B, and the control logic circuit 54 may allow for substantially equal power transfer from the first and second power sources 28, 30. According to another embodiment, the transformer T2, the current sensing transformers T1A, T1B, and the control logic circuit 54 may be utilized to achieve non-equal power transfer from the first and second power sources 28, 30.

Although the power converter 10 is configured to accept input from two electrically isolated power sources and provide a single DC output, the power converter 10 may operate similar to a traditional forward converter operating in peak current mode control. When power is supplied to the first primary circuit 12 via the first power source 28, and switching devices Q1A, Q2A are in the conducting state, primary current may flow from the first power source 28 through the first primary winding 22 of the transformer T2 via the switching device Q1A, through the first current sense transformer T1A, and through the switching device Q2A. The current flowing through the first primary winding 22 of the transformer T2 may be a combination of magnetizing current and reflected secondary current.

Based on the output voltage ($V_{OUT}$) of the secondary circuit 16 and from information received from the first current sense transformer T1A, the control logic circuit 54 may terminate a drive signal through the first gate drive circuit 56A that may place switching devices Q1A, Q2A in a non-conducting state. When the switching devices Q1A, Q2A are placed in a non-conducting state, the magnetizing energy stored in the transformer T2 may cause the voltage across the first primary winding 22 to reverse and the current rectifiers CR2A, CR3A to conduct. The magnetizing energy stored in the transformer T2 may be transferred to capacitor C2A in a resonant fashion with the primary inductance of the transformer T2 through the current rectifiers CR3A, CR2A. Thereafter, the energy transferred to capacitor C2A may flow through the resistor R1A back to the capacitor C1A. When the gate drive signal transmitted by the controller (not shown) is reasserted, the switching devices Q1A, Q2A may be placed back into a conducting state.

Similarly, when power is supplied to the second primary circuit 14 via the second power source 30, and switching devices Q1B, Q2B are in the conducting state, primary current may flow from the second power source 30 through the second primary winding 24 of the transformer T2 via the switching device Q1B, through the second current sense transformer T1B, and through the switching device Q2B. The current flowing through the second primary winding 24 of the transformer T2 may be a combination of magnetizing current and reflected secondary current.

Based on the output voltage ($V_{OUT}$) of the secondary circuit 16 and from information received from the second current sense transformer T1B, the controller (not shown) included in the control logic circuit 54 may terminate a drive signal through the second gate drive circuit 56B that may place switching devices Q1B, Q2B in a non-conducting state. When the switching devices Q1B, Q2B are placed in a non-conducting state, the magnetizing energy stored in the transformer T2 may cause the voltage across the second primary winding 24 to reverse and the current rectifiers CR2B, CR3B to conduct. The magnetizing energy stored in the transformer T2 may be transferred to capacitor C2B in a resonant fashion with the primary inductance of the transformer T2 through the current rectifiers CR3B, CR2B. Thereafter, the energy transferred to capacitor C2B may flow through the resistor R1B back to the capacitor C1B. When the gate drive signal transmitted by the controller (not shown) is reasserted, the switching devices Q1B, Q2B may be placed back into a conducting state.

According to one embodiment, power need not be supplied to the first and second primary circuits 12, 14 at the same time. For example, the first and second primary circuits 12, 14 may operate alternately in different time slots. In the first time slot, the first primary circuit 12 may have an "on" period where current flows from the first power source 28 to the first primary winding 22 of transformer T2, then a "reset" period when the core 52 of transformer T2 is reset. In the second time slot, following the "reset" period of the first primary circuit 12, the second primary circuit 14 may have an "on" period where current flows from the second power source 30 to the second primary winding 24 of transformer T2, then a "reset" period when the core 52 of transformer T2 is again reset for the next cycle.

According to another embodiment, only the first primary circuit 12 may be operative under standard operating conditions, and the switching frequency of the gate drive circuit 56A may be doubled to effectively fill the first and second time slots described hereinabove. According to this embodiment, the second primary circuit 14 may only become operative following a failure affecting the first power source 28, the first primary circuit 12, or the first primary winding 22 of transformer T2. Similarly, according to another embodiment, only the second primary circuit 14 may be operative under standard operating conditions. According to this embodiment, the first primary circuit 12 may only become operative following a failure affecting the second primary circuit 14.

According to another embodiment, the second power source 30 may be implemented as a UPS or battery bank having relatively limited storage capacity. According to this embodiment, the control logic circuit 54 may be configured such that the majority of power is provided by the first power source 28 while relatively little energy is drawn from the second power source 30. For example, the control logic circuit 54 may be configured to block the gate drive signal to the second gate drive circuit 56B, thereby reducing the power provided by the second power source 30.

According to another embodiment, the resistors R1A, R1B may be sized to allow for energy to be transferred between the first and second power sources 28, 30. For example, as described hereinabove, the power provided by the first power source 28 may be coupled to the first primary winding 22 when the switching devices Q1A, Q2A are in a conducting state. The energy from the first primary winding 22 may be coupled to the secondary winding 26 and the second primary winding 24 by the transformer T2. The intrinsic diodes in the switches Q1B, Q2B (as shown in FIG. 3) may conduct and transfer energy from the second primary winding 24 to the capacitor C2B. By adjusting the ohmic value of resistor R1B, the energy may be transferred from the capacitor C2B to the second power source 30, thereby completing the transfer of energy from the first power source 28 to the second power source 30. Energy may be transferred from the second power source 30 to the first power source 28 in a similar manner. According to another embodiment, the resistors R1A, R1B may be sized such that the current rectifiers CR1A, CR1B and the capacitors C2A, C2B may be eliminated.

Although the present invention has been described and illustrated in detail herein with respect to certain embodiments, it is to be understood that the same is by way of example and is not to be taken by way of limitation. In addition, it will be appreciated by those of ordinary skill in the art that modifications and variations of the embodiments presented herein may be implemented without departing from the spirit and scope of the present invention as described in the appended claims. For example, the transformer T2 may include additional primary, secondary or even tertiary windings, the resistors R1A, R1B may be replaced by switches and control logic, and auxiliary diodes may be utilized in conjunction with the switching devices Q1A, Q2A, Q1B, Q2B for embodiments where the switching devices Q1A, Q2A, Q1B, Q2B do not include intrinsic diodes.

What is claimed is:

1. A dual input power converter, comprising:
   a transformer having a first primary winding and a second primary winding, and having a secondary winding;
   a first primary circuit for coupling a first power source to the first primary winding;
   a second primary circuit for coupling a second power source to the second primary winding;

a secondary circuit connected to the secondary winding for rectifying a voltage across the secondary winding; and a control circuit coupled to the first and second primary circuits for controlling the first and second primary circuits such that the first and second primary circuits cyclically couple the first and second power sources, respectively, to the transformer at a common frequency in an interleaved mode such that, during a switching cycle, the first primary circuit couples the first power source to the transformer during a first interval of the switching cycle and the second primary circuit couples the second power source to the transformer during a second, subsequent interval of the switching cycle.

2. The power converter of claim 1, wherein the first primary circuit includes a first switching device for coupling the first power source to the first primary winding and wherein the control circuit includes a first output terminal coupled to a control terminal of the first switching device.

3. The power converter of claim 2, wherein the first switching device includes a field-effect transistor.

4. The power converter of claim 2, wherein the second primary circuit includes a second switching device for coupling the second power source to the second primary winding and wherein the control circuit includes a second output terminal coupled to a control terminal of the second switching device.

5. The power converter of claim 4, wherein the second switching device includes a field-effect transistor.

6. The power converter of claim 4, wherein the first primary circuit is electrically isolated from the second primary circuit.

7. The power converter of claim 6, wherein the first power source is electrically isolated from the second power source.

8. The power converter of claim 1, wherein the first primary circuit includes first and second switching devices for coupling the first power source to the first primary winding.

9. The power converter of claim 8, wherein the first and second switching devices include field-effect transistors.

10. The power converter of claim 8, wherein the second primary circuit includes third and fourth switching devices for coupling the second power source to the second primary winding.

11. The power converter of claim 10, wherein the third and fourth switching devices include field-effect transistors.

12. The power converter of claim 10, wherein the first primary circuit is electrically isolated from the second primary circuit.

13. The power converter of claim 12, wherein the first power source is electrically isolated from the second power source.

14. The power converter of claim 10, wherein the first primary circuit further includes:

a first current rectifier connected to a first terminal of the first primary winding and a second current rectifier connected to a second terminal of the first primary winding.

15. The power converter of claim 14, wherein the first primary circuit further includes a capacitor connected to the first current rectifier.

16. The power converter of claim 14, wherein the second primary circuit further includes:

a third current rectifier connected to a first terminal of the second primary winding; and a fourth current rectifier connected to a second terminal of the second primary winding.

17. The power converter of claim 16, wherein the second primary circuit further includes a capacitor connected to the third current rectifier.

18. The power converter of claim 1, further comprising:

a first current sense transformer connected in series with the first primary winding; and a second current sense transformer connected in series with the second primary winding.

19. A dual input power converter, comprising:

a transformer having a first primary winding and a second primary winding,and having a secondary winding;

a first current sense transformer connected in series with the first primary winding;

a second current sense transformer connected in series with the second primary winding;

a first primary circuit including at least one switching device for coupling a first power source to the first primary winding;

a second primary circuit including at least one switching device for coupling a second power source to the second primary winding;

a secondary circuit connected to the secondary winding for rectifying a voltage across the secondary winding; and a control circuit coupled to the first and second primary circuits for controlling the first and second primary circuits such that the first and second primary circuits couple the first and second power sources, respectively, to the transformer at a common frequency in an interleaved mode such that, during a switching cycle, the first primary circuit couples the first power source to the transformer during a first interval of the switching cycle and the second primary circuit couples the second power source to the transformer during a second, subsequent interval of the switching cycle.

20. The power convener of claim 19, wherein:

the first primary circuit includes two switching devices for coupling the first power source to the first primary winding; and the second primary circuit includes two switching devices for coupling the second power source to the second primary winding.

21. The power converter of claim 20, wherein the first primary circuit further includes:

a first current rectifier connected to a first terminal of the first primary winding; and a second current rectifier connected to a second terminal of the first primary winding, and wherein the second primary circuit further includes:

a third current rectifier connected to a first terminal of the second primary winding; and a fourth current rectifier connected to a second terminal of the second primary winding.

22. The power converter of claim 21, wherein the first primary circuit includes a first capacitor connected to the first current rectifier, and wherein the second primary circuit includes a second capacitor connected to the third current rectifier.

23. The power converter of claim 1, wherein the control circuit is for controlling the first primary circuit to couple the first power source to the transformer at twice the common frequency when the second power source fails.

24. The power converter of claim 19, wherein the control circuit is for controlling the first primary circuit to couple the first power source to the transformer at twice the common frequency when the second power source fails.

25. In a power converter having a first primary circuit for coupling a first power source to a first primary winding of a transformer, a second primary circuit for coupling a second power source to a second primary winding of the transformer, and a secondary circuit coupled to a secondary winding of the transformer for rectifying a voltage across the secondary winding, a method of controlling the first and second primary circuits comprising:

controlling the first primary circuit to cyclically couple the first power source to the first primary winding at a common frequency; and controlling the second primary circuit to cyclically couple the second power source to the second primary winding at the common frequency, wherein the first and second primary circuits operate in an interleaved more such that, during a switch cycle, the first primary circuit couples the first power source to the transformer during a first interval of the switching cycle and the second primary circuit couples the second power source to the transformer during a second, subsequent interval of the switching cycle.

26. The method of claim 25, further comprising controlling the first primary circuit to couple the first power source to the transformer at twice the common frequency when the second power source fails.

* * * * *

UNITED STATES PATENT AND TRADEMARK OFFICE
CERTIFICATE OF CORRECTION

PATENT NO. : 6,833,635 B2
DATED : December 21, 2004
INVENTOR(S) : Robert H. Kippley It is certified that error appears in the above-identified patent and that said Letters Patent is hereby corrected as shown below:

Column 7,
Line 55, add a semicolon after "winding".

Column 8,
Line 38, delete "convener" and replace therefor -- converter --.

Signed and Sealed this

Sixth Day of September, 2005

JON W. DUDAS
*Director of the United States Patent and Trademark Office*